Jan. 2, 1962 J. W. DODSWORTH 3,015,437
TOTALIZING CONTROL MEANS
Filed Sept. 26, 1958 7 Sheets-Sheet 1

INVENTOR.
JAMES W. DODSWORTH
BY
Norman Friedman
ATTORNEY

INVENTOR.
JAMES W. DODSWORTH
BY Norman Friedman
ATTORNEY

INVENTOR.
JAMES W. DODSWORTH
BY
Norman Friedman
ATTORNEY

Jan. 2, 1962 J. W. DODSWORTH 3,015,437
TOTALIZING CONTROL MEANS
Filed Sept. 26, 1958 7 Sheets-Sheet 6

INVENTOR.
JAMES W. DODSWORTH
BY Norman Friedman
ATTORNEY

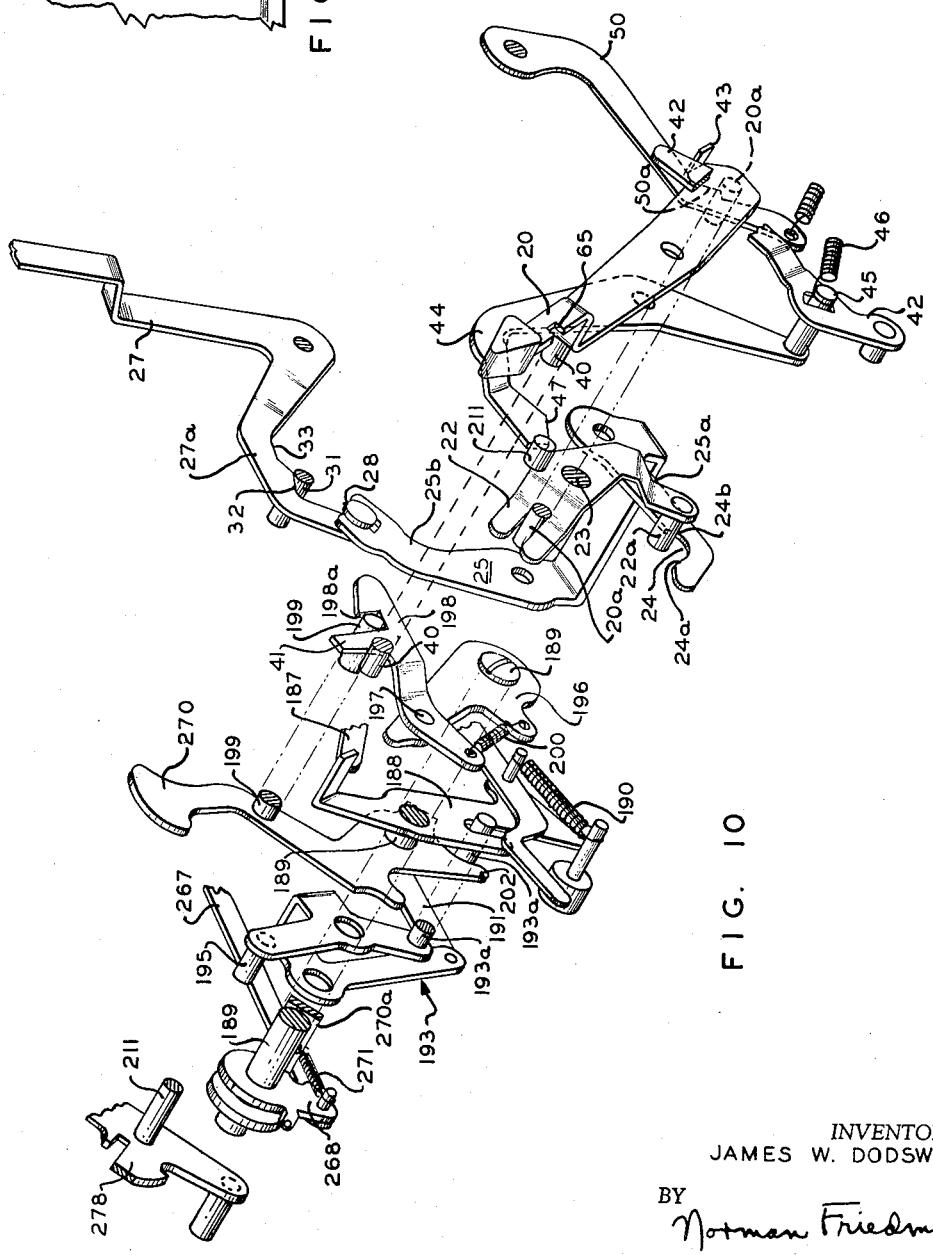

United States Patent Office 3,015,437
Patented Jan. 2, 1962

3,015,437
TOTALIZING CONTROL MEANS
James W. Dodsworth, Mount Tabor, N.J., assignor to Monroe Calculating Machine Company, Orange, N.J., a corporation of Delaware
Filed Sept. 26, 1958, Ser. No. 763,646
18 Claims. (Cl. 235—60.2)

This invention relates to calculating machines and more particularly to means for controlling the taking of totals and subtotals from a register.

By way of definition, throughout the present specification and claims the term "totalizing" will be employed as being generic to these two operations, i.e., total and subtotal taking.

In certain respects, the present invention represents an improvement over the subject matter of Crosman Patent No. 2,298,201, issued October 6, 1942. That patent provides means, in a listing calculator, operable to interrupt a negative total-taking operation prior to the printing of the total. The operator was thereby made aware of the overdraft condition and could avoid printing the overdraft on the statement.

However, the mechanism of the Crosman patent presents certain disadvantages in its application to actual banking operations. For example, a bank may be willing to honor an overdraft provided it does not exceed some stipulated maximum figure. Using the Crosman arrangement, the operator could determine the amount of the overdraft only by resuming the interrupted totalizing operation as originally initiated, i.e., as a total, which could be printed on any suitable sheet of paper positioned to receive printing in place of the statement. However, the very act of completing the interrupted total-taking to determine its extent would be effective to clear the overdraft value from the register. If the operator then wished to print the overdraft total on the statement, it would be necessary to operate the machine to cause the register once again to register the overdraft value.

The present invention avoids this disadvantage by providing means adjustable to allow the interrupted negative total-taking operation to be resumed as a subtotal even though it was initiated as a total. Thus the operator can determine the value of the overdraft while retaining it in the register. Thereafter, the retained overdraft value can be printed on the statement, if desired, by effecting a total-taking operation.

It is therefore a general object of the invention to provide a novel totalizing control mechanism for calculating machines.

It is a further object to provide a totalizing control mechanism which, when enabled, is effective to supersede the normal operation of the machine totalizing mechanism and cause a negative total-taking operation to be interrupted and then selectively completed as a subtotal.

Another object is the provision of mechanism for interrupting a negative total-taking operation and then selectively resuming it either as a total or a subtotal operation.

Another object is the provision of mechanism for interrupting a negative totalizing operation and then selectively continuing it either as initiated (total or subtotal) or only as a subtotal.

It is a further object to provide mechanism adjustable to cause all totalizing operations, whether initiated as totals or subtotals, to be performed as subtotals.

In the preferred illustrative embodiment disclosed herein, a conventional bookkeeping machine is provided with a manually operable three-position lever for controlling the devices of the invention. When the lever is in forward position, the devices of the invention are ineffective to modify the normal operations of the machine. With the lever in middle position, a negative total or subtotal operation will be interrupted before printing occurs, and the cyclic mechanism of the machine will come to rest, thereby indicating to the operator the fact that an overdraft exists. Totalizing may then be resumed in either one of two ways. The lever can be moved to forward position to cause totalizing to continue as originally initiated, that is to say as a total or a subtotal. Alternatively, however, the lever can be moved from middle to rear position. This adjustment will cause the totalizing to be resumed as a subtotal regardless of whether it was initiated as a subtotal or a total.

As a further feature of the invention, if the lever is adjusted to and kept in rear position, all subsequently initiated totalizing operations will be carried out as subtotals even though initiated as totals. This feature is particularly useful when it is necessary to rewrite a statement.

The above and other objects, features, and advantages of the present invention will be more fully understood from the following specific description when considered in connection with the accompanying drawings.

In the drawings:

FIG. 10 is an exploded perspective view of FIG. 9.

FIG. 11 is a fragmentary detail in top plan of the keyboard, showing the auxiliary, manually controlled latch for holding the totalizing control lever in rear position.

General description of the machine

Figure 1:
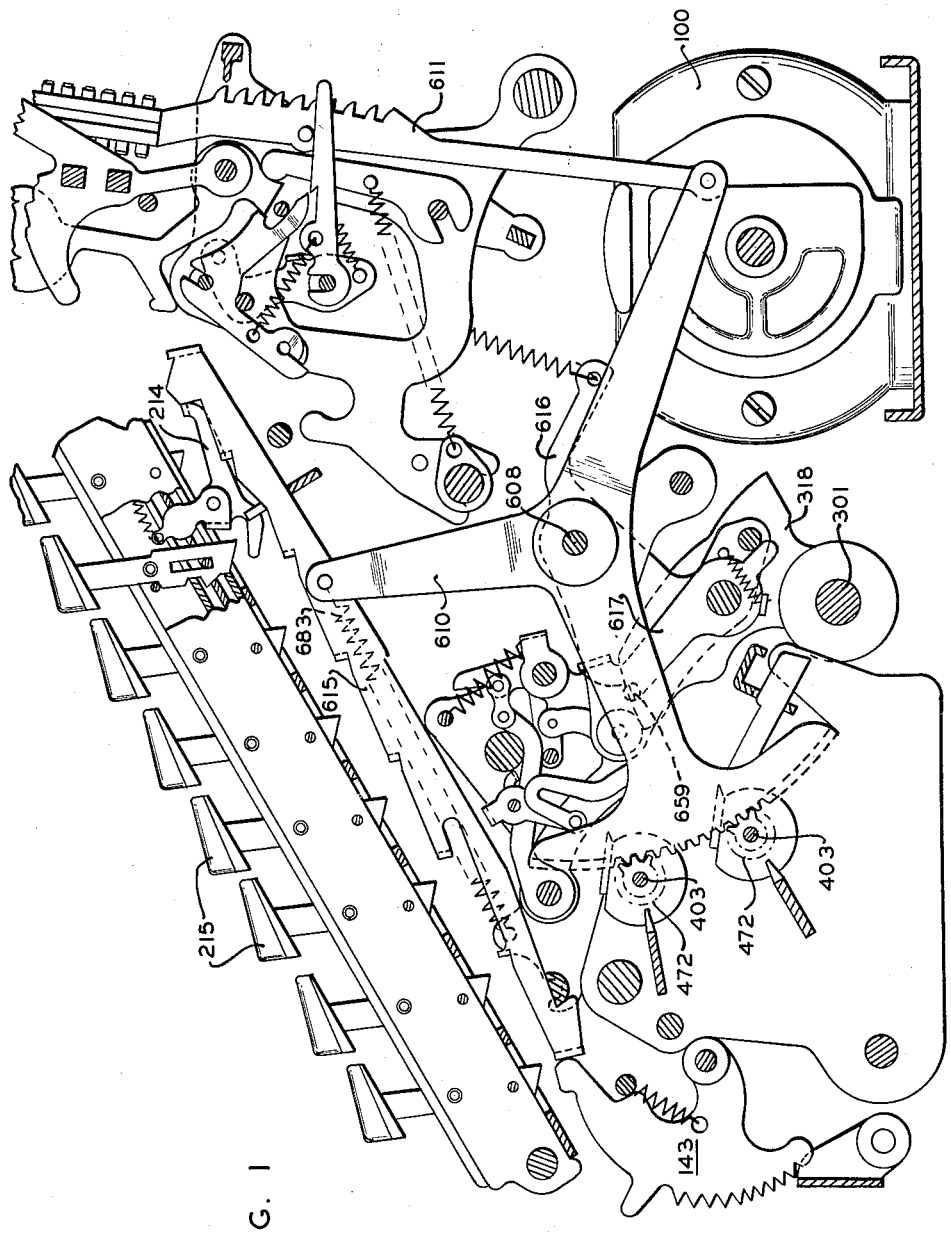
FIG. 1 is a right side elevation of an accounting adding-listing machine in which the present invention is embodied, showing the basic operating mechanism of the machine.

The adding listing machine to which the invention is shown as applied is of the well-known type illustrated in U.S. Patent No. 1,946,572, issued February 13, 1934, to Loring P. Crosman and entitled "Listing Calculator," and Patent No. 2,570,931, issued October 9, 1951, to Howard M. Fleming, and entitled "Printing Tabulating Mechanism." It will be sufficient to describe the machine proper very generally and to say that for each denominational order the machine is provided with a three armed differential actuator lever 610 (FIG. 1), loosely mounted on a shaft 608. The forward arm of each lever 610 terminates in a segmental actuating rack; the rearward arm has a lister type bar 611 pivoted thereto, and the upper arm has pivotal connection with a differential stop or index bar 615 cooperating with a bank of digit keys 215 to limit the movement of the lever 610.

The digit keys 215 are depressible to represent a value and when depressed are latched in position with the bottoms of their stems lying in the path of movement of the related stop lugs of the bars 615, and allow such bars to advance a distance proportional to the value of the depressed key, upon operation of the machine. Depression of a digit key will also remove a column latch 214 from the path of movement of its related bar 615, which latches prevent movement of an actuator lever 610 in any column in which no key is depressed.

A rock shaft 301 is provided with cam means 318 for governing the movement of a spring tensioned rocker frame 616, carrying a series of dogs 617 each normally engaged by stud 659 of a lever 610. As shaft 301 is rotated forwardly (counterclockwise, FIG. 1) frame 616 will be rocked about shaft 608, and any of the levers 610 which have been released by depression of digit keys 215 will be allowed to rotate, under the influence of their springs 683, until they are stopped by the lugs of bar 615, contacting with the stems of the keys. Upon rearward (return) rotation of shaft 301, the dogs 617 will return the operated levers 610 to normal position. This excursion of levers 610 serves to register amounts set in the key board upon one or more accumulators 403 and to set up a similar amount on the printing line of the type bars. Crawl carry mechanism of the type disclosed in Patent No. 2,450,787 is provided between adjacent orders of the accumulators.

Shaft 301 is oscillated by an electric motor 100, connected through suitable gearing and clutch means, with a crank arm 105 (FIG. 2) connected by a rod 108 to an arm fast upon shaft 301 so that as crank arm 105 is rotated, shaft 301 will be oscillated.

Motor operation is controlled by motor bars or keys through a clutch lever 106 which is adapted to close the motor circuit after it is moved out of restraining engagement with the spring operated clutch. A spring 111 tends to pull lever 106 away from the clutch pawl 153, the lever being normally held in clutch disengaging position by means of a latch 112. Latch 112 is controlled by a trigger 113, connected through suitable linkage with a plus bar 114. Upon depression of the plus bar, trigger 113 is rocked clockwise to release latch 112 and clutch lever 106 will be pulled out of engagement with the clutch pawl 153 to start the machine in operation.

Upon release of plus bar 114, latch 112 will return under spring action into latching position and, toward the end of the cycle of operation, a projection 115 of the crank member 105 will contact an extension 116 of the clutch lever 106 and will force said lever back into latched position, breaking the electric circuit and bringing the end of lever 106 into the path of movement of the rotating clutch pawl 153 to terminate the cycle.

As more fully disclosed in the Crosman Patent 1,946,572, to which reference is made for complete details, during plus operation, the accumulator shafts 403 (FIG. 1) will be moved away from the actuator racks of levers 610 before said racks are allowed to move, and will be moved to reengage the register gears 472 while the racks lie in the extreme operated positions permitted by the keys 215 and stop bars 615. As shaft 301 is returned and the racks are raised, the value set in the keyboard will be additively transferred to the register.

Also, as set forth in said patent, operation of a minus bar 274 will initiate motor operation and will also adjust suitable devices for changing the time at which the accumulators are shifted out of and into mesh with the segmental racks so that the accumulators remain in engagement during the first or downward stroke of the racks and are thereafter disengaged before the return stroke of said racks, and consequently register subtractively those amounts set up in the keyboard.

Figure 4:
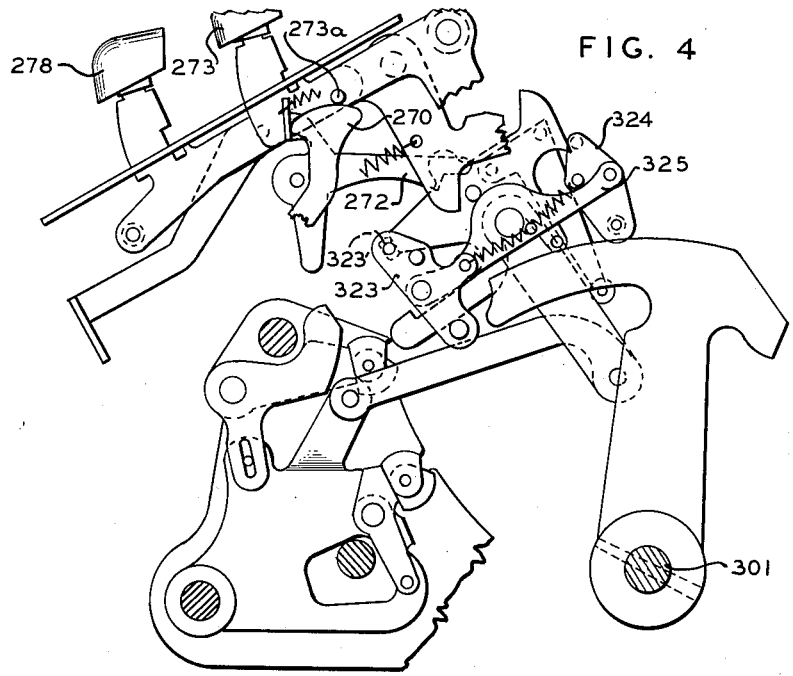
FIG. 4 is a fragmentary right side elevation, showing the total and subtotal keys and the mechanism for controlling engagement of the accumulators with the actuator racks.

The devices which control the time of meshing of the accumulators with actuator racks include a rocker device 325 (FIG. 4) carrying at its opposite ends flipper arms 323 and 324 respectively.

*Carriage tabulation*

Also as described in Patent No. 1,946,572, the platen carriage of the machine is tabulated from right to left by suitable means, the carriage being held in its various tabulated positions by a notched bar 1 (FIG. 5) fixed to the carriage, the walls of the notches forming spaced stops 293 engageable successively by the end 6 of a stop arm 7 fulcrumed on the fixed framing of the machine.

Under normal adjacent column tabulation, the stop arm 7 is tripped free of bar 1 and immediately released for reengagement with an adjacent notch of bar 1. More specifically, during a registration cycle, lever 279 is lowered to permit a latch pawl 282 pivotally mounted on a trigger 284 to be spring biased clockwise to a position above a lug 280 of the lever. Near the end of the cycle the lever is restored upwardly whereby lug 280, acting through latch pawl 282, will raise trigger 284, and spring 287 will rock the trigger 284 counterclockwise to position its projection 288 above the projection 6 of lever 7. This rocking movement of trigger 284 will cause a stud 289 fast to said trigger to disengage the pawl 282 from lug 280 of lever 279 whereupon spring 287 will draw trigger 284 downwardly until stopped by shoulder 290 thereof contacting a projection 292 of a bracket 286.

The downward movement of trigger 284 will cause projection 288 to disengage projection 6 of stop arm 7 from tab bar 1 whereby the carriage will be free to move to the next columnar position.

Figure 3:
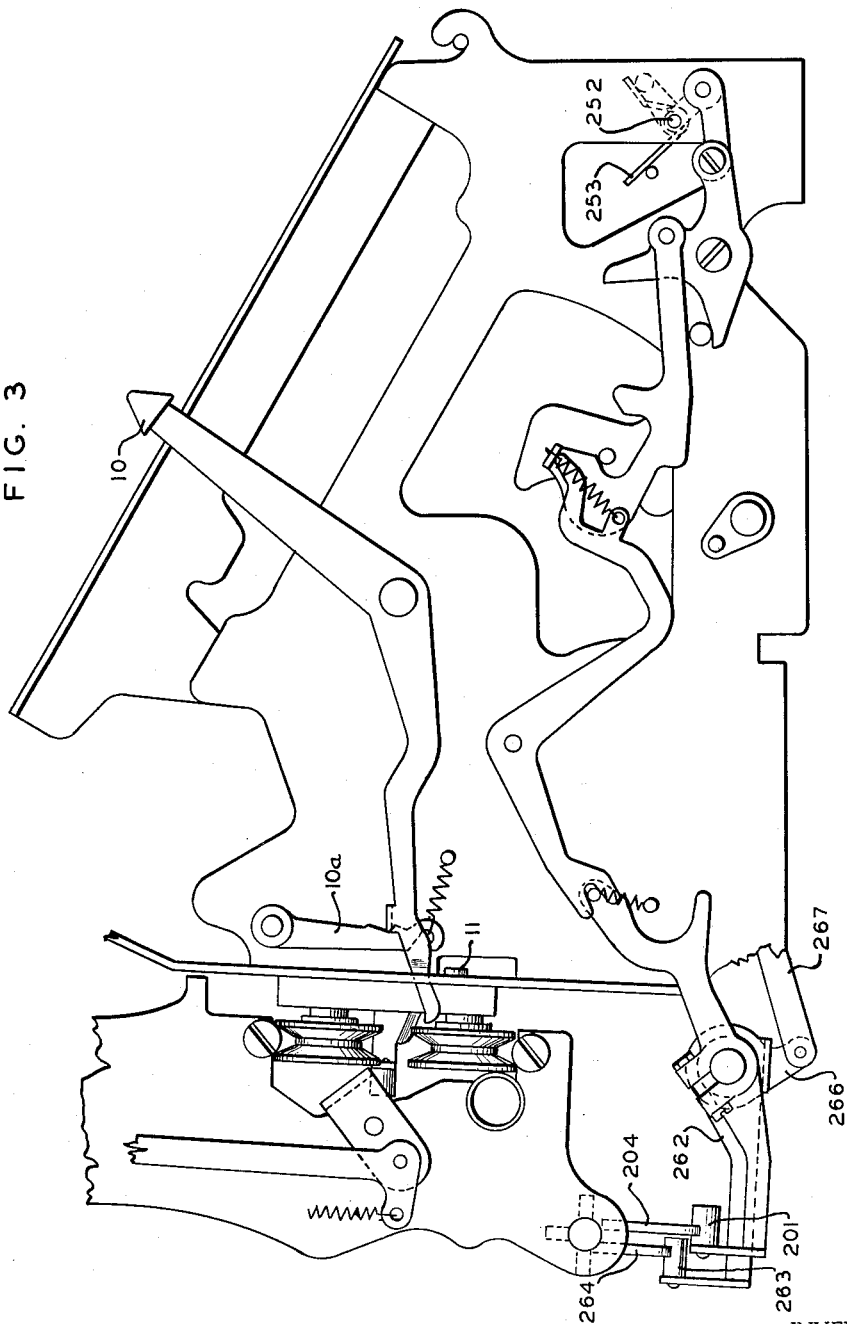
FIG. 3 is a left side elevation of the machine, showing the lever for disabling the automatic carriage tabulating mechanism, and the linkage controlled by the position of the carriage for automatically initiating total and subtotal operations.
Figure 5:
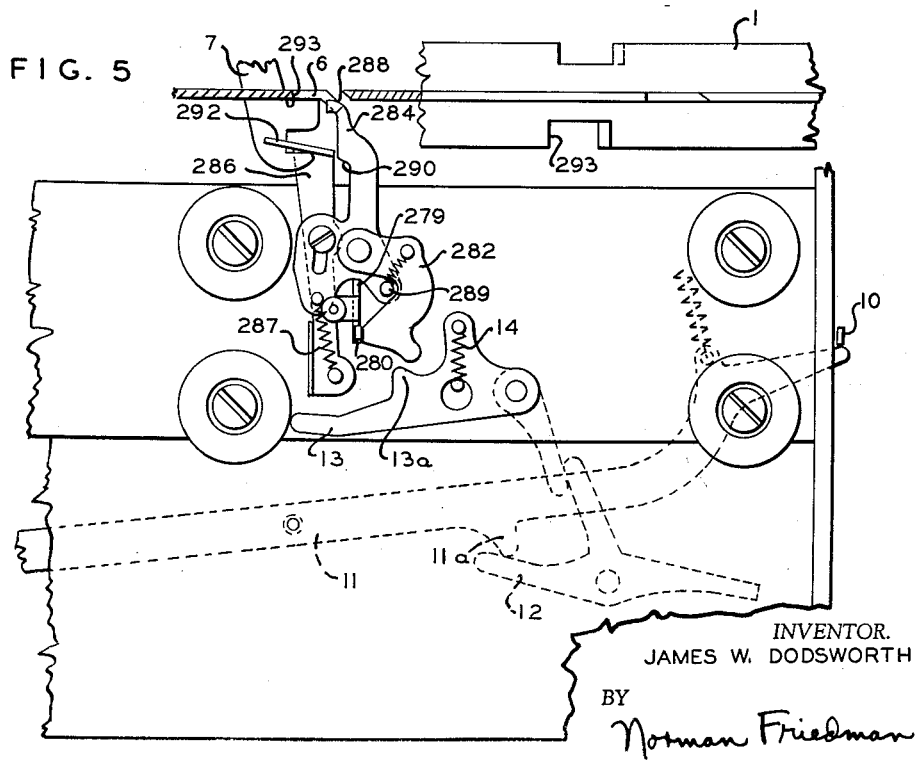
FIG. 5 is a fragmentary rear elevation of the mechanism which controls automatic carriage tabulation.

Conventional mechanism is also provided for selectively disabling the carriage tabulating mechanism so that a registration cycle performed in a given columnar position will be ineffective to cause a carriage shift, as follows. A manually operable control lever 10 (FIGS. 3, 5) normally disposed in forward position is pivoted on the left side framing of the machine and extends toward the rear where it overlies the rightmost end of a lever 11 formed with a depending projection 11a engaged by one arm of a bell crank 12. An upstanding arm of the bell crank abuts a depending leg of a lever 13 and holds the latter in clockwise position against the urge of spring 14. In this normal position of the parts as seen in FIG. 5, a projection 13a of lever 13 lies below the path of movement of the lower end of latch pawl 282. However, operating movement of lever 10 in rearward direction will rock lever 11 clockwise causing bell crank 12 to swing lever 13 clockwise to place projection 13a in blocking relation with pawl 282. Accordingly, when lug 280 is lowered (as described before) the pawl will be unable to move into a driven relation therewith, and when the lug thereafter is restored upwardly it will not be effective to operate trigger 284. The carriage will therefore remain in the given columnar position. Lever 10 is adapted to be releasably held in either of its positions by means of a latch 10a.

For controlling setting of the accumulators automatically in accordance with the columnar position of the platen carriage, program mechanism as disclosed in Patent 1,946,572 is provided. Such mechanism is of the well-known type wherein an elongated tubular member fast with the carriage is provided at appropriate longitudinal locations with apertures of different sizes which are sensed by fingers carried by the carriage, the sensing means being effective to control the selection and meshing of the registers with the actuator racks during a selector cycle initiated immediately upon the carriage coming to rest in a columnar position. Following the selector cycle, a registration cycle is automatically effected.

Totalizing (totals)

A total is taken in well-known manner in response to depression of key 278 (FIG. 2) by releasing the index bars 615 successively from right to left and allowing the actuators 610 to rotate the accumulator wheels subtractively until suitable projections on the wheels engage zero stop members. This will set the total (the amount subtracted from the wheels) in the type bars 611, following which the machine will be caused to cycle by a crank arm 378 which is rocked clockwise in response to zeroizing of the highest order numeral wheel of the register. Crank arm 378 will thereupon shift an elongated slide 130 downwardly, tripping latch 112 to initiate a cycle of motor operation. At mid-cycle, the print hammers will be tripped to print the total. Successive zeroizing of the numeral wheels is necessary because of the crawl tens transfer mechanism employed.

If the total is negative, it will stand in the register as the complement of the true negative total. The complemental negative total is converted to the true negative value by means of a series of storage segments 143 (FIG. 1) located at the front of the machine. The first step in taking either a positive or a negative total is the same and involves zeroizing the total out of the accumulator wheels. In the case of a negative total, the zeroizing will cause the highest order wheel to register "9," and the zeroizing movement of the associated rack from eight to nine printing position will cause the overdraft control shaft 146 (FIG. 2) to be rocked counterclockwise, thereby throwing the negative total control devices of the machine into operation to control three consecutive subtractive cycles of machine operation during which the complemental negative total will be converted to the corresponding true negative value and printed. During the initial zeroizing operation, the forward movement of the index bars will set the complemental total into the storage segments 143. The segments are held at this digital setting during the first and second cycles. In the second cycle, the segments limit the forward excursion of the actuator racks whereby the complemental total is subtracted from the register, which stands at zero, thereby causing the true negative value to be registered. The third and final cycle comprises a conventional total-taking cycle wherein the true negative value is zeroized from the register and set up in the type bars, which are then operated at mid-cycle to print the true negative total.

Since the clutch control lever 106 is normally latched in clutch disengaging position at the end of a single cycle of operation as described earlier, provision is made in negative totalizing operations to allow the machine to continue through the necessary plural cycles of operation by disabling latch 112. To this end, operating movement of the overdraft shaft 146 will unlatch a plate 159 for clockwise rotation under the urge of a pivoted arm 160 which is biased clockwise by a suitable spring. A lug 161 of the plate will accordingly be moved to blocking position above the lower upturned end 162 of slide 130 (now in lowered position) whereby latch 112 is prevented from reengaging with the clutch control lever 106. Therefore, near the end of the cycle, when lever 106 is restored clockwise by projection 115 it will not be engaged by latch 112 but will again be free to rock counterclockwise for continued cyclic operation of the machine.

Reference is hereby made to Crosman Patent No. 1,915,296 as modified by Crosman Patent 2,261,341 for a full and detailed disclosure of the conventional mechanism whereby positive and negative totals are taken.

Total key 278 may be depressed manually, and also automatically under control of the carriage program mechanism. With reference to the latter, as the carriage is shifted to the columnar position in which a total is to be taken, a suitably placed cam shoe 204 (FIG. 3) carried thereon will act to depress a roller 201, this operation being effective, as described in detail in Dodsworth Patent 2,756,926, to enable mechanism which will operate during the immediately following selector cycle to provide for rotation (clockwise in FIG. 3, counterclockwise in FIG. 2) of shaft 252 under the urging of spring 253. Consequently, arm 259 coupled to said shaft by crank arm 258 will be carried downwardly and will depress the total key 278 to initiate a total-taking operation.

Totalizing (positive subtotals)

The taking of a positive subtotal differs from a positive total only in that the accumulator register is engaged with the actuator racks 610 on both the forward and return strokes of the latter, so that the total subtracted from the register in the zeroizing operation is reentered on the return stroke. A subtotal may be initiated manually by depression of key 273 (FIG. 4) which is effective to perform the same functions as key 278, i.e., start operation of the successive zeroizing mechanism and set the flipper mechanism 323, 324, 325 for subtractive operation to hold the register engaged with the racks during the forward stroke. There is provided a normally ineffective spring biased latch 272 adapted, as described in Fleming Patent No. 2,809,782, to engage a pin 323' on flipper arm 323 and thereby prevent the accumulator from being disengaged on the return stroke. A spring urged arm 270 normally holds latch 272 in counterclockwise ineffective position. When the subtotal key 273 is depressed, a stud 273a (FIG. 4) carried thereby will rock arm 270 clockwise allowing the latch to be spring urged clockwise to enabled position.

A subtotal may also be initiated automatically under control of the carriage program mechanism. As described in the last mentioned Fleming patent, a program subtotal is initiated, not by depressing the subtotal key, but rather by depressing the total key 278 and at the same time pulling arm 270 in rearward direction to release latch 272. The means for automatically depressing the total key has been described earlier. The means for operating arm 270 is similar to the corresponding mechanism described at length in the above mentioned Fleming patent. Briefly, it comprises a roller 263 (FIG. 3) adapted to be depressed by a suitably placed cam shoe 264 carried by the carriage as the latter is shifted into a given tabular position. Roller 263 is carried on one arm 262 of a pivoted bell crank whose other arm 266 is connected to a push link 267 which extends to the front of the machine where it is connected to a crank 268 (FIG. 10). The crank is coupled to a lateral horizontal extension 270a of arm 270 by means of a spring 271. Accordingly, upon movement of the carriage into the tabular position where a subtotal is to be taken, shoe 264 will depress roller 263 rocking crank 268 clockwise and imparting like movement to arm 270 through spring 271. Latch 272 is thereupon free to move clockwise to enabled position. Simultaneous with the depression of roller 263, shoe 204 will cooperate in similar fashion with roller 201 to cause depression of the total key 278 as described hereinbefore. It should be noted that the operation of the program mechanism is timed so that arm 270 will be rocked clockwise before the total key is depressed. The reasons for this will be dealt with later.

Totalizing (negative subtotals)

A negative subtotal requires four cycles of machine operation, the first three of which are substantially the same as in the taking of a negative total with the exception that printing is not effected during the third cycle. In the fourth cycle, the true negative value is subtracted from the accumulator (which has been zeroized in the third cycle) to cause the latter to register the original complemental negative value, and it is printed at mid-cycle.

Figure 6:
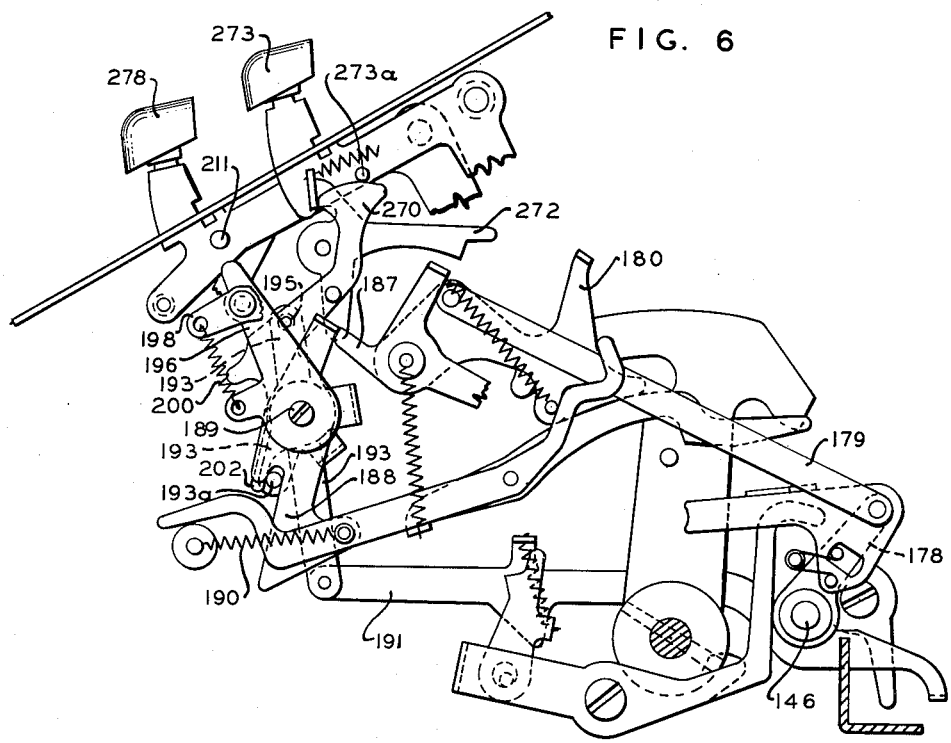
FIG. 6 is a fragmentary right side elevation of the positive and negative subtotal control mechanism.

For a complete disclosure of the mechanism which controls negative subtotal operations, reference is made to Fleming Patent No. 2,050,302, dated August 11, 1936. As disclosed therein the negative subtotal mechanism is enabled in response to forward spring urged movement of a link 191 (FIGS. 6, 10). The forward end of link 191 is connected to one arm of a three-armed lever 193 pivotally mounted on a shaft 189. The lever is coupled to a rocker member 188 by means of a pin 193a fast on the former extending through a slot of the latter. Rocker member 188 is biased clockwise by spring 190 but is normally held in the inactive clockwise position seen in FIG. 6 by latch 187. The latch is tripped through crank arm 178, link 179, and plate 180 upon counterclockwise operating movement of the overdraft control shaft 146 in response to the zeroizing of the negative total, whereupon spring 190 will rock rocker arm 188, and therefore lever 193, clockwise to shift link 191 forwardly to operated position. The clockwise movement of lever 193 will also cause a lateral stud 195 thereon to engage and hold latch 272 in unoperated position even though the latter element has been released from the restraint of arm 270, which has previously been rocked clockwise to initiate the subtotal operation.

When a total (rather than a subotal) operation is initiated, the negative subtotal mechanism is prevented from operating by blocking lever 193 against clockwise movement as follows. Pivoted on shaft 189 is a lever 196 on which there is rockably mounted at 197 a latch 198. The latch is formed adjacent its rearward end with an upwardly opening slot 198a adapted to receive a lateral pin 199 of arm 270. A spring 200 fixed at its lower end to lever 196 biases latch 198 counterclockwise so that pin 199 normally lies within slot 198a. Arm 270 and lever 196 are therefore normally coupled together by the latch to form in effect one rigid member. The functions of latch 198 will be discussed further subsequently under the heading "Totalizing Control Lever." Upon depression of the total key 278 to initiate a total-taking operation, a stud 211 fixed to the key stem will be carried downward to a position behind lever 196 blocking this latter element and arm 270 against clockwise movement. A depending tail 202 of arm 270 normally lies just in front of stud 193a carried by the three-armed lever 193, and will now be effective to prevent said lever from rocking clockwise if latch 187 should be tripped in response to operation of shaft 146 upon zeroizing a negative total.

When a program subtotal operation is initiated, however, it is obviously essential that three-armed lever 193 not be prevented from operating since the value to be subtotaled may be negative. As described earlier a program subtotal is initiated by automatically rocking arm 270 clockwise and depressing the total key, the movement of the arm being effected before the total key descends. Accordingly, by the time stud 211 of the total key stem moves into the range of lever 196, this latter element will have been swung toward the rear by arm 270 whereby the stud will now descend to a position in front of the lever rather than behind it. Hence, lever 196 and arm 270 will not be blocked against clockwise movement and three-armed lever 193 will be free to operate if the value being subtotaled is negative.

*Totalizing control lever*

As was briefly mentioned earlier there is provided in accordance with the present invention a lever 20 (FIGS. 2, 8, 9, 10) manually movable to any one of three positions. In its forward position of adjustment the lever is ineffective to modify the normal operations of the machine. However, when moved to the middle position of adjustment lever 20 will adjust the devices of the invention to enable suitable blocking means to halt a plural cycle totalizing operation at the end of the first cycle if the total is an overdraft (negative) value. The suspension of totalizing after the first cycle serves to prevent printing of the total and also serves to indicate the overdraft condition to the operator. Thereupon she may proceed in either one of two ways:

(a) The totalizing may be continued as originally initiated (total or subtotal) merely by returning lever 20 to its forward inactive position. Here, the adjustment of the lever to forward position merely disables the blocking means, (b) The totalizing can be continued as a subtotal, whether originally initiated as a total or a subtotal, by moving lever 20 to rear position. This adjustment of the lever disables the blocking means and also enables the subtotal control mechanism.

The mechanism for interrupting a totalizing operation when lever 20 is in middle position is constructed and operates as follows. The lever is pivoted intermediate its ends on the machine framing at 21 and is provided at its lower end with a pin 20a by which it is coupled to the slotted upper end of an arm 22 which is fulcrumed at 23, whereby the angular position of arm 22 is determined by the adjusted position of lever 20. In the middle position of lever 20 (FIGS. 2, 7) a stud 22a fixed to the depending end of arm 22 lies substantially in alignment with the center of a V-shaped notch 24 provided on one arm 25a of a bell crank 25. Stud 22a is therefore ineffective to block the bell crank against clockwise movement under the urging of a spring 26.

Figure 7:
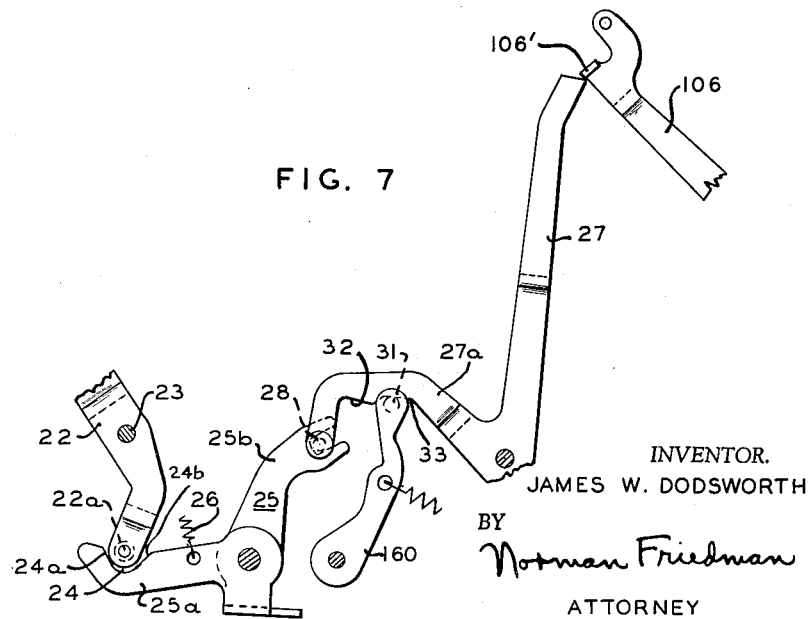
FIG. 7 is a fragmentary right side elevation, showing the mechanism for interrupting a negative totalizing operation in operated position.

A forward extension 27a of a blocking lever 27 has pin and slot connection 28 with the other arm 25b of the bell crank. The upper end of blocking lever 27 is adapted to be positioned under lug 106' of the clutch control lever 106 to prevent the latter from rocking counterclockwise at the end of the first cycle of an overdraft totalizing operation. Normally, however, a stud 31 fixed to arm 160 engages surface 32 of the lever extension 27a, holding the lever clockwise and bell crank 25 counterclockwise against the tension of spring 26. It will be recalled from the earlier description of the negative totalizing mechanism that arm 160 is allowed to swing clockwise when the overdraft shaft 146 operates in response to the initial zeroizing performed in the totalizing of a negative value. This movement of arm 160 will bring stud 31 into alignment with a recessed portion 33 of lever 27, allowing the upper blocking end thereof to move forwardly toward active position. The timing is such that lever 27 will move toward the left (FIG. 2) before latch 112 is tripped by downward movement of slide 130 in releasing lever 106 to start motor operation. The blocking lever 27 will accordingly come to rest abutting the right side face of lug 106'. When latch 112 is subsequently tripped, spring 111 will, as heretofore described, rock lever 106 counterclockwise to allow the clutch to engage whereby motor operation is initiated. Near the end of the first cycle of a negative totalizing operation, cam portion 115 of crank 105 will restore lever 106 clockwise to normal position with sufficient overthrow to allow the upper end of blocking lever 27 to move into effective position beneath lug 106', stud 22a entering V-notch 24 as an incident to this movement. Accordingly, lever 106 will be prevented from rocking counterclockwise, and the clutch pawl 153 will therefore be held disengaged whereby the totalizing operation will come to a halt at the end of the first cycle. The position of the parts at this time is shown in FIG. 7. It may be noted that the extreme operated position of the blocking lever 27 as seen in FIG. 7 is determined by stud 31 abutting the base of recess 33.

Figure 8:
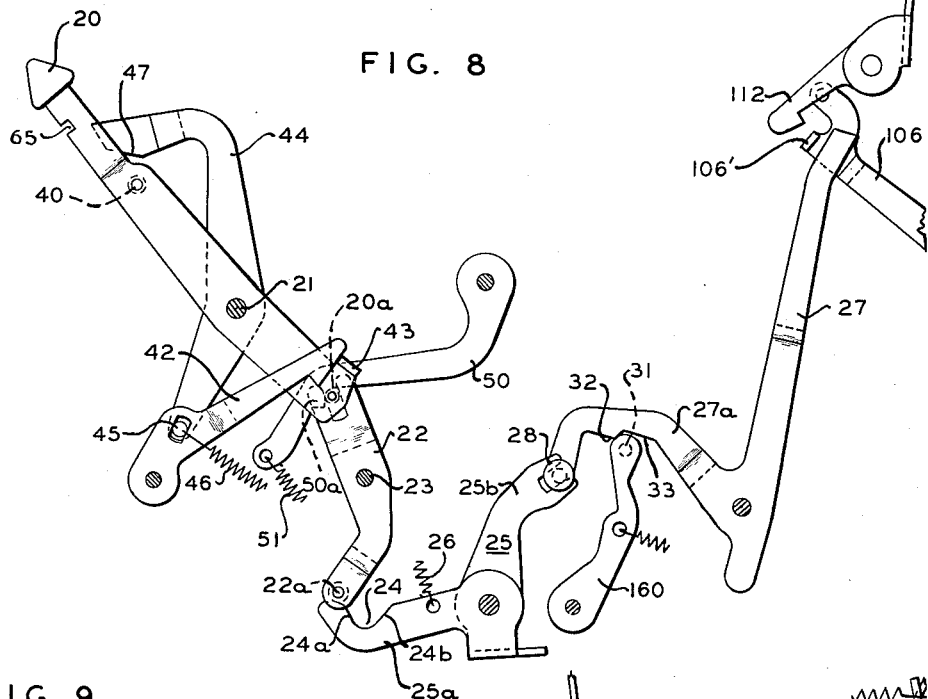
FIG. 8 is a right side elevation, showing the position of the mechanism of FIG. 7 when the totalizing control lever is moved to forward position to resume an interrupted negative totalizing operation.

If it is desired to resume the totalizing operation as originally initiated, lever 20 is then shifted to forward inactive position (FIG. 8). The resulting clockwise movement of lever 22 will cause stud 22a to engage the sloping left side surface 24a of notch 24, camming bell crank 25 counterclockwise and the blocking arm 27 clockwise to free the clutch control lever 106 for resumption of motor operation and completion of totalizing.

Alternatively, lever 20 may be shifted from middle to rear position (FIG. 9) to resume the totalizing operation as a subtotal, regardless of whether the operation initiated was a subtotal or a total. The rearward movement of the lever will render blocking arm 27 inactive by virtue of clockwise rocking movement of said arm in response to camming engagement of stud 22a with the sloping right side surface 24b of notch 24. The means whereby rearward movement of lever 20 is effective to control the totalizing mechanism so that the resumed operation is completed as a subtotal will be described shortly.

If control lever 20 is in forward inactive position when the overdraft totalizing operation is initiated, blocking lever 27 will be prevented from interrupting the operation at the end of the first cycle since stud 22a will be in the same blocking relation with bell crank 25 as shown in FIG. 8. The crank will be blocked against clockwise movement, and therefore when arm 160 rocks clockwise in response to the initial zeroizing of an overdraft value, blocking arm 27 will be held in unoperated position even though pin 31 has been removed from blocking relation therewith.

Resumption of totalizing as a subtotal

The mechanism which serves to continue totalizing as a subtotal in response to the aforementioned rear adjustment of lever 20 will now be described. It will be recalled from the previous description that in order for a negative subtotal to be taken, it is necessary to allow three-armed lever 193 (FIGS. 6, 10) to rock clockwise. As described earlier, if the totalizing operation is initiated as a subtotal this condition will be satisfied by virtue of stud 211 moving downwardly to a position in front of lever 196 upon depression of the total key. However, it will also be remembered that depression of the total key 278 to initiate a total-taking operation is effective to cause stud 211 to descend to a position behind lever 196 thereby blocking this element, and consequently arm 270 coupled thereto by latch 198, against clockwise movement. Accordingly, the depending tail 202 of said arm 270 would block lever 193 of the negative subtotal mechanism against clockwise operating movement. Therefore, if a negative total-taking operation were initiated and then interrupted after one cycle in accordance with the invention, the negative subtotal mechanism would stand in blocked condition as indicated above.

Figure 2:
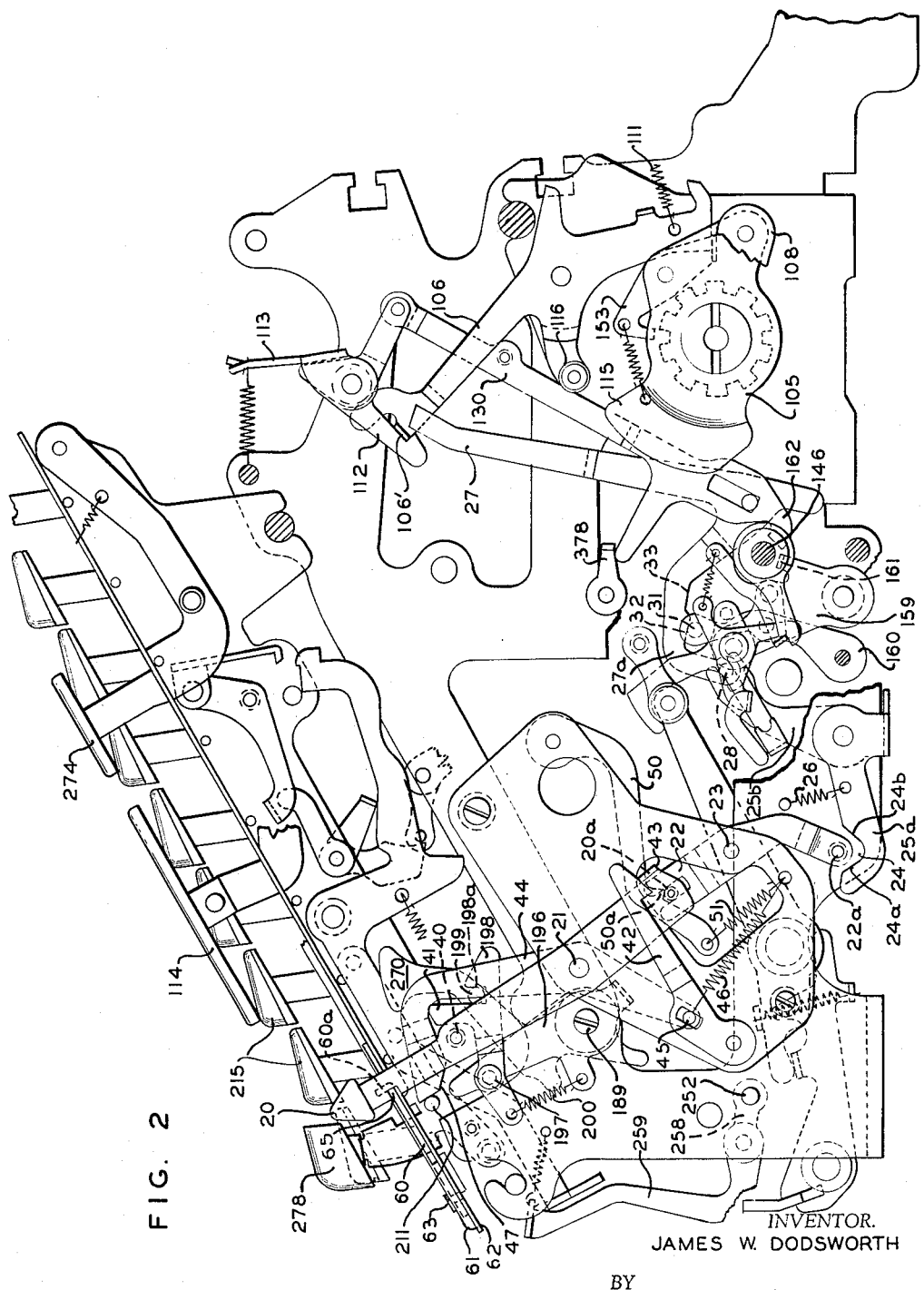
FIG. 2 is a view similar to FIG. 1, showing the totalizing control lever of the invention and associated mechanism.
Figure 9:
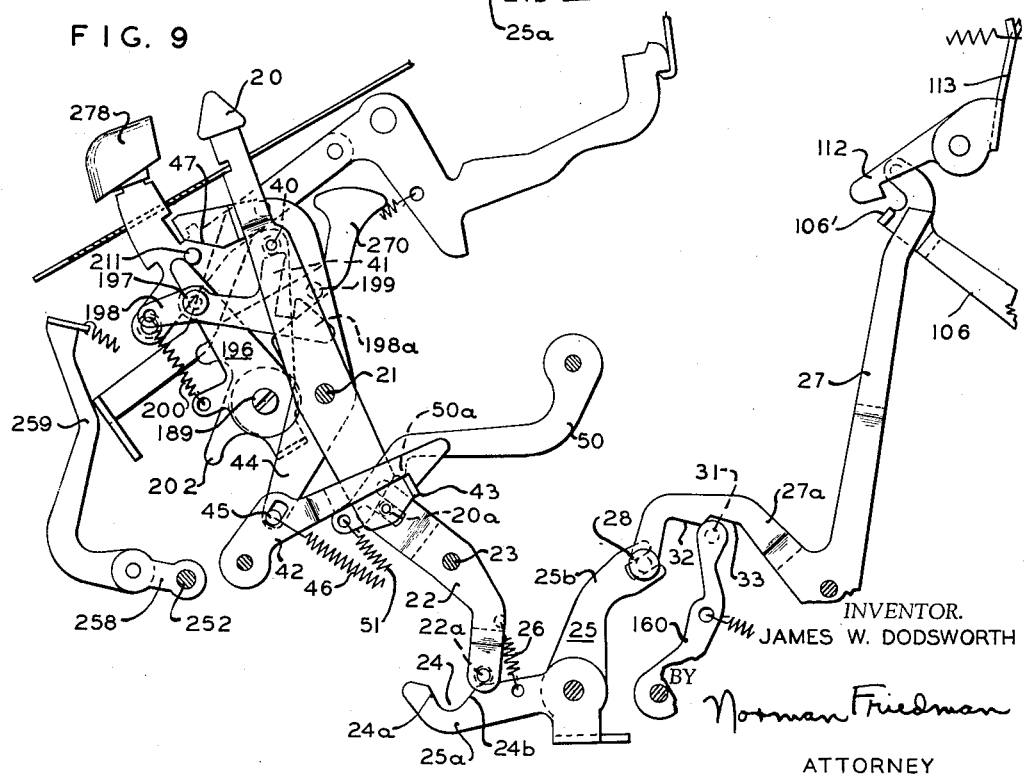
FIG. 9 is a view similar to FIG. 8, showing the position of the mechanism for resuming an interrupted negative total-taking operation as a subtotal when the totalizing control lever is moved to rearward position after interruption of total-taking.

Provision is therefore made whereby movement of lever 20 from middle to rear position after interruption of a negative total-taking operation, in addition to causing resumption of motor operation is also effective to supersede the original total adjustment by unblocking the negative subtotal mechanism. Secured to lever 20 is a leftwardly extending lateral stud 40 (FIGS. 2, 9, 10). In the rearward movement of the lever this stud will engage the forward edge of an upstanding finger 41 of latch 198. Since lever 196 is now blocked against clockwise movement by stud 211, stud 40 in moving rearwardly will cam latch 198 clockwise about the latter's pivot 197 on lever 196 an amount sufficient to disengage slot 198a from pin 199 of arm 270. As seen in FIG. 9, in the extreme rearward position of control lever 20, stud 40 will come to rest seated against the sloping upper end of latch finger 41 thereby holding latch 198 in clockwise released position. Arm 270, being now uncoupled from the blocked lever 196, will no longer be effective to prevent triple armed member 193 (FIGS. 6, 10) from rocking clockwise under the urge of spring 190. The negative subtotal mechanism will therefore be rendered effective.

It is desirable that lever 20 be kept in rearward position to hold blocked lever 27 disabled until the subtotal operation is completed. Otherwise, if the lever 20 were allowed to return to middle position lever 27 would again interrupt the totalizing operation at the conclusion of the then current cycle, since pin 31 of arm 160 is aligned with recess 33 of lever 27, element 160 not being restored to home position until the fourth cycle of a negative subtotal operation. Lever 20 is held in rear position until the subtotal is completed by a latch 42 (FIGS. 2, 8, 9, 10) which is spring urged to snap over a lug 43 of the lever as the latter is moved clockwise into rear position (FIG. 9).

At the conclusion of the subtotal operation, latch 42 will be automatically tripped to allow lever 20 to be spring returned to middle position. For this purpose, there is provided an arm 44 pivoted to the framing at 21. At its lower end the arm has pin and slot connection 45 with latch 42. A spring 46 attached to the pin tends to swing the arm counterclockwise and the latch clockwise. When lever 20 is in middle position and the total key in normal undepressed position (FIG. 2), the previously described stud 211 secured to the total key stem lies immediately in front of a forward extension of the upper end of arm 44. Latch 42 is thus held in the clockwise position shown in FIG. 2 and is prevented from dropping over lug 43 of lever 20 to latch the lever if the lever should be shifted to rearward position with the total key raised.

Upon depression of the total key 278, stud 211 will be carried downward and removed from blocking relation with arm 44. Then, when lever 20 is subsequently manually shifted to the rear after interruption of negative totalizing, latch 42 will drop over lug 43, and arm 44 will pivot counterclockwise to place an inclined cam surface 47 thereof in the return path of stud 211.

As described before, the rearward positioning of lever 20 will cause resumption of an interrupted overdraft totalizing operation as a subtotal. As is conventional, the total key will be held latched in depressed position until the end of the fourth and final cycle of the subtotal operation and will then be automatically released by mechanism such as disclosed in the aforenoted Patent 2,050,302. In return upward movement of the total key, stud 211 will engage cam surface 47 of arm 44 and will swing the latter element clockwise rocking latch 42 counterclockwise to release lever 20 from its rear position. The lower longitudinal edge of a detent arm 50, acting on pin 20a of lever 20 under the counterclockwise urge of spring 51, will thereupon return lever 20 counterclockwise toward middle position where it will be halted and held by the pin abutting tooth 50a of the detent arm. Arm 50 is effective to releasably detent lever 20 in middle and forward positions, the counterclockwise resilient bias of the arm causing pin 20a to move into engagement with one or the other side of tooth 50a.

Auxiliary latching means

In addition to the automatically controlled latch 42 described before, there is also provided an auxiliary manually controlled latch 60 (FIGS. 2, 11) which can be manually set to hold lever 20 latched in rearward position for as long as desired. This feature is of particular utility when it is necessary to rewrite statements. For example, the programming of the machine may be such that normally a total will be taken in the "Balance" column of a statement. However, when rewriting a statement, it is necessary that the balance obtained from each line of posting be retained in the machine as a subtotal to be modified in accordance with the next line of posting. This requirement can be satisfied by the present invention merely by throwing lever 20 to rearmost position when the machine is in normal unoperated condition, and then maintaining the lever in this condition throughout the rewriting operation.

This adjustment of lever 20 will be effective to supersede the normal operation of the machine to the extent that all subsequent total-taking operations will be performed as subtotals. When lever 20 is shifted to the rear, stud 40 thereon will engage the upstanding finger 41 of latch 198 and will rock the entire unit comprising lever 196 and arm 270 coupled thereto by said latch clockwise about shaft 189. At this point, it may be remembered from the earlier description that when a similar rearward adjustment of lever 20 is effected after interruption of a negative total-taking operation, stud 40 acts to rock latch 198 clockwise about its pivot 197 on lever 196 to uncouple arm 270 from lever 196. As was indicated this rocking movement about pivot 197 is imparted to the latch because the total key is in depressed position whereby stud 211 blocks lever 196 from clockwise movement about shaft 189.

However, when lever 20 is moved to its rearmost adjusted position with the total key in unoperated or raised position, lever 196 is free to swing to the rear. Hence engagement of stud 40 with finger 41 will cause lever 196, latch 198, and arm 270 to pivot clockwise as one rigid unit about shaft 189. As described hereinbefore, clockwise movement of arm 270 releases the subtotal latch 272 for positive subtotal operations and also removes the arm from blocking relation with pin 193a of the triple armed lever 193 of the negative subtotal mechanism. Accordingly, all subsequent positive and negative totalizing operations will be performed as subtotals so long as lever 20 is maintained in rearward adjustment.

Lever 20 could of course be held to the rear manually against the tension of spring 51. However, this would be extremely cumbersome. Manually settable latch 60 is therefore provided for performing this function. Latch 60 (note FIGS. 2 and 11) comprises a crank arm disposed forwardly of the upper end of lever 20. The crank arm lies between closely spaced cover plates 61 and 62 of the machine and is pivoted at its forward end on a pin 63 secured between the plates. An upturned lug 60a formed at the left-hand rearward end of the crank arm extends through a longitudinal slot 64 in plate 61 whereby movement of the latch is limited by abutment of the lug with the respective opposite end walls of the slot. In its left-hand position the latch is ineffective. However, after lever 20 is shifted to rearmost position, lug 60a may be grasped by the operator and used to swing the latch to the right (FIG. 11) to position the rear right-hand corner thereof within a forwardly opening slot 65 of lever 20. Until the latch is subsequently disabled by being manually returned to the left, it will hold lever 20 in rear position against the tension of spring 51.

*Operation*

It is believed that the operation and application of the invention will be readily understood from the foregoing detailed description. However, by way of review it is deemed expedient to assume a typical simplified example in which the bookkeeping machine is programmed to post the customer statements of a bank's checking accounts. That is to say, after entry of the old balance into the register of the machine, checks will be subtracted in a first column of the statement form, deposits added in a subsequent column, and finally the new balance will be printed as a result of a total-taking operation performed in a third column. As is customary, the platen carriage of the machine is automatically tabulated from position to position. After the balance is printed, the carriage will automatically shift to home position or some other tabular position depending on the particular posting program for which the machine has been set up.

When lever 20 is in forward position, the normal operations of the machine will not be affected. However, if the lever has been set to middle position the printing of a negative balance will be prevented by virtue of the total-taking operation being interrupted upon completion of the first cycle thereof. If the account is one in which the bank will honor an overdraft regardless of its amount, lever 20 is manually restored to forward position whereby the interrupted total-taking operation is resumed as originally initiated and the new balance printed.

However, the account may be one where an overdraft will be honored only it it does not exceed some predetermined amount, making it necessary for the operator to first determine the extent of the overdraft. Accordingly, after interruption of the total-taking operation, lever 10 is manually swung to operated position (to disable the automatic carriage shifting mechanism) and lever 20 moved to the rear to continue the totalizing—originally initiated as a total—as a subtotal. To avoid printing the subtotal on the statement being posted, some other sheet of record material may be placed over the statement or substituted therefor. During the subtotal operation, lever 20 will be held in rearmost position by latch 42 and upon completion of the operation will be automatically released to return to middle position. If after determining the amount of the overdraft the operator decides to honor the overdraft, she will reposition the statement to receive printing and will set levers 20 and 10 to their respective forward ineffective positions and manually operate the total key 278 to initiate a total-taking operation. Since lever 20 is now ineffective, the taking of the overdraft total will proceed uninterrupted. Further, since the tabulating control lever 10 is also ineffective, the automatic carriage shifting mechanism will be free to operate in its normal fashion to cause shifting of the carriage upon completion of the total-taking.

It will be understood that various changes may be made in the form, detail, arrangement, and proportions of the parts without departing from the spirit and scope of the invention as defined in the appended claims. It is therefore intended that the foregoing disclosure of one specific embodiment of the invention be illustrative only and not restrictive of the claims.

I claim:

1. In a calculating machine having a register, totalizing means operable to take totals and subtotals from said register, means for initiating operation of said totalizing means to take a total, means for interrupting a total-taking operation if the value being totaled is negative, and means for resuming an interrupted total-taking operation as a subtotal operation.

2. In a calculating machine having a register, totalizing means operable to take totals and subtotals from said register, means for initiating operation of said totalizing means to take a total, means for interrupting a total-taking operation if the value being totaled is negative, means for resuming said interrupted total-taking operation as a subtotal operation, and means for enabling said interrupting means and said resuming means.

3. The invention according to claim 2, said enabling means comprising a manipulative device adjustable to one position to enable said interrupting means and adjustable from said one position to a second position to disable said interrupting means and enable said resuming means.

4. In a calculating machine having a register, totalizing means operable to take totals and subtotals from said register, means for initiating operation of said totalizing means to take a total, means for interrupting a total-taking operation if the value being totaled is negative, and means for resuming said interrupted total-taking operation selectively as a total or a sub-total operation.

5. The invention according to claim 4, further comprising manipulative control means adjustable to a first position effective to enable said interrupting means and thereafter selectively adjustable to either of a second or third position effective to control said resuming means to resume said interrupted total-taking operation as a subtotal or total operation respectively.

6. The invention according to claim 5, said first position being intermediate said second and third positions.

7. In a calculating machine having a register, totalizing means operable to take totals and subtotals from said register, means for initiating operation of said totalizing means to take a total, means for initiating operation of said totalizing means to take a subtotal, means for interrupting a totalizing operation initiated by either of said initiating means if the value being totalized is negative, and means for resuming said interrupted totalizing operation as a subtotal whether initiated as a total or a subtotal.

8. In a calculating machine having a register, totalizing means for taking totals and subtotals from said register, means for initiating operation of said totalizing means to take a total, means for initiating operation of said totalizing means to take a subtotal, means for interrupting a totalizing operation initiated by either of said initiating means if the value being totalized is negative, means operable to: (a) resume said interrupted totalizing operation as originally initiated and, alternatively, (b) resume said interrupted totalizing operation as a subtotal whether initiated as a total or a subtotal.

9. In a calculating machine having a register, totalizing means for taking totals and subtotals from said register, means for initiating operation of said totalizing means to take a total, means for initiating operation of said totalizing means to take a subtotal, means for interrupting a totalizing operation initiated by either of said initiating means if the value being totalized is negative, means for resuming said interrupted totalizing operation as originally initiated, and means for resuming said interrupted totalizing operation as a subtotal whether initiated as a total or a subtotal.

10. In a calculating machine having a register, totalizing means for taking totals and subtotals from said register, means for initiating operation of said totalizing means to take a total, means for preventing said totalizing means from taking a total if the value being totaled is negative, means for rendering said totalizing means effective to take a subtotal after operation of said preventing means, and a single manipulative device for controlling operation of said preventing means and said means for rendering said totalizing means effective to take a subtotal.

11. In a calculating machine having a register, totalizing means operable to take totals and subtotals from said register and including a control device movable to an operated position to adjust said totalizing means for subtotal operation, means for initiating operation of said totalizing means to take a total, a member coupled to said control member for movement therewith, means for blocking said member against movement in response to operation of said initiating means, and means for selectively uncoupling said control device from said member.

12. In a calculating machine having a register, totalizing means operable to take totals and subtotals from said register and including a control device movable to an operated position to adjust said totalizing means for subtotal operation, means for initiating operation of said totalizing means to take a total, means for blocking said control member against operating movement in response to operation of said initiating means, means for interrupting a total-taking operation if the value being totaled is negative, and means for resuming said interrupted total-taking operation as a subtotal operation, said resuming means including means operable to release said control member from said blocking means.

13. In a calculating machine having a register, totalizing means operable to take totals and subtotals from said register and including a control device movable to an operated position to adjust said totalizing means for subtotal operation, means for initiating operation of said totalizing means to take a total, a member coupled to said control device for movement therewith, means for blocking said member against movement in response to operation of said initiating means, means for interrupting a total-taking operation if the value being totaled is negative, means for resuming said interrupting total-taking operation as a subtotal operation, said resuming means including means operable to uncouple said control device from said blocked member.

14. In a calculating machine having a register, totalizing means operable to take totals and subtotals from said register, means for initiating operation of said totalizing means to take a total, means for initiating operation of said totalizing means to take a subtotal, and superseding means adjustable to cause said totalizing means to take a subtotal upon operation of either of said initiating means.

15. In a calculating machine having a register, totalizing means operable to take totals and subtotals from said register, means for initiating operation of said totalizing means to take a total, superseding means operable to cause said totalizing means to take a subtotal instead of a total upon operation of said initiating means, and means for selectively enabling said superseding means.

16. The invention according to claim 15, said enabling means including a manipulative device manually adjustable between one position in which said superseding means is disabled and another position in which said superseding means is enabled.

17. The invention according to claim 16, further comprising selectively operable means for maintaining said manipulative device in said another position throughout a plurality of totalizing operations.

18. In a calculating machine having a register, totalizing means operable to take totals and subtotals from said register, first initiating means for initiating operation of said totalizing means to take a total, second initiating means for initiating operation of said totalizing means to take a subtotal, and superseding means operable to cause an operation of said totalizing means initiated by said first initiating means to be carried out and completed as a subtotal operation if the value being totalized is negative.

References Cited in the file of this patent
UNITED STATES PATENTS

| | | |
|---|---|---|
| 2,050,302 | Fleming | Aug. 11, 1936 |
| 2,298,201 | Crosman | Oct. 6, 1942 |